United States Patent [19]
Stribling et al.

[11] Patent Number: 5,281,425
[45] Date of Patent: Jan. 25, 1994

[54] BAIT PRODUCT FOR CRABS OR LOBSTERS AND METHOD OF PREPARATION

[75] Inventors: Kenneth V. Stribling, St. Charles, Ill.; Keith H. Brown; J. Lloyd Tysinger, Jr., both of Hampton, Va.; Bill Heriford, Hampton, Va.

[73] Assignees: Teepak, Inc., Westchester, Ill.; BTH Bait, Inc., Newport News, Va.

[21] Appl. No.: 861,687

[22] Filed: Apr. 1, 1992

[51] Int. Cl.$^5$ .............................. A01K 61/00
[52] U.S. Cl. .............................. 426/1; 426/413
[58] Field of Search .............. 426/641, 644, 646, 657, 426/807, 413

[56] References Cited

U.S. PATENT DOCUMENTS

| | | | |
|---|---|---|---|
| 2,555,088 | 5/1951 | Irwin . | |
| 2,780,021 | 2/1957 | Fagg | 43/41 |
| 3,047,975 | 8/1962 | Pretorius | 43/42.06 |
| 3,730,728 | 5/1973 | Patashnik et al. | 426/657 |
| 3,903,304 | 9/1975 | Groninger, Jr. et al. | 426/1 |
| 3,958,357 | 5/1976 | Frank | 43/42.06 |
| 4,053,640 | 10/1977 | Takasugi | 426/1 |
| 4,206,236 | 6/1980 | Orth | 426/646 |
| 4,362,748 | 12/1982 | Cox | 426/1 |
| 4,731,247 | 3/1988 | Wolford et al. | 426/1 |
| 5,089,277 | 2/1992 | Prochnow | 426/1 |

FOREIGN PATENT DOCUMENTS

| | | | |
|---|---|---|---|
| 0092294 | 8/1978 | Japan | 426/1 |
| 8606251 | of 1086 | PCT Int'l Appl. | |
| 510399 | of 1971 | Switzerland . | |

OTHER PUBLICATIONS

US Fishery Leaflet #28 (1946) US Department of the Interior Fish and Wildlife Service, p. 16.

*Primary Examiner*—Arthur L. Corbin
*Attorney, Agent, or Firm*—Robert P. Simpson; Michael L. Dunn; Howard M. Ellis

[57] ABSTRACT

Skeletal remains, in unrendered condition, which are a by-product of the deboning of uncooked poultry, pork, or beef, are ground to a hamburger-like consistency and processed through sausage stuffing apparatus to form an encased and sealed bait product which provides olfactory stimulation to crabs or lobsters or other related species.

19 Claims, No Drawings

BAIT PRODUCT FOR CRABS OR LOBSTERS AND METHOD OF PREPARATION

FIELD OF THE INVENTION

The present invention relates generally to bait which is useful for trapping crabs, lobsters, and other related species, and more specifically to a bait which is packaged in food casing materials and does not use aquatic or marine by-products.

BACKGROUND OF THE INVENTION

In the fishing industry, the predominate method that is used to catch crabs, lobsters, and related species generally comprise lowering a trap into place in waters which are considered strategic fishing locations by fishermen. Such locations are generally those which the fishermen have come to know, by experience, have a greater predominance of the aquatic life species, which are their intended prey, in comparison to other areas. For instance, many areas in the Chesapeake Bay are noted for an abundance of several types of crabs. The coastal areas off of Massachusetts and Maine are noted for their abundance of lobsters. Various other areas of the world are likewise noted for their concentrations and abundance of such species of aquatic life. Generally, these areas comprise shallow waters in comparison to those waters which are further off shore where deep sea fishing, using hooks and nets, tends to be more predominate.

The traps that are used to catch crabs, lobster, and the like are generally of two different varieties. The first variety, used for recreational short-term trapping of, for example, crabs, comprises a metal basket structure with hinged side walls. The traps, including the sidewalls, are generally predominantly formed from wire or metal mesh materials to resemble, for example, cubes. The side walls are hinged, at their bottom edges to the floor of the trap, such that when the trap settles to the bottom of the designated fishing area, underwater, the sidewalls will fall open. Lines are attached to the upper edges of the sidewalls such that when the lines are drawn tautly, upwardly, the sidewalls will likewise be pulled upwardly, closing the trap and thus entrapping the crabs which have entered the trap. The lines from the movable sidewalls of such traps extend upwardly and are usually merged into a single line which in turn extends to the surface and is attached to, for example, a boat, a wharf, or a buoy.

Generally, recreational crab traps are placed in the water and left for a relatively short period of time, for example, time spans ranging from 15 or 30 minutes up to several hours. Such traps are normally checked by the fishermen at regular intervals so as to remove accumulated aquatic life and also to ensure that the bait placed in the traps is still secure and intact within those traps.

Commercial crab traps consist of metal frame covered with wire mesh; fitted with wire mesh cups for baiting or narrow entry ports of wire with a maze like interior. They are left for 24 hours or more to collect crabs. Traps used for catching, for example, lobsters, on the other hand, are designed for long-term use wherein the trap is placed on the bottom in the preferred section of water to be left for several days. Such traps, for example, may be constructed of wood, structured in an open lattice in the form of half of an axially divided cylindrical section, divided longitudinally. Such traps conceptually include a maze or labyrinth, i.e., of flexible netting material, through which the lobsters find their way into the inside of the trap. On the other hand, the maze or labyrinth provides a seemingly insurmountable block to the way out as the netting material is flexed to constrict the opening therethrough. The concept is that the lobster is attracted into the trap by the bait which is placed in the trap. Once in the trap, the lobster's concentration is on the bait material, which is a foodstuff for the lobster, and the motivation to leave the trap is much less than the attraction provided by the foodstuff. The diminished motivation, plus the labyrinth or maze system of the trap, generally are sufficient to prevent escape of the lobster. Both crab traps and lobster traps, as described above, are well known to the fishing industry and have been used for many years although new variations of both types are occasionally presented to the market. The types of traps used forms no part of the present invention.

As mentioned previously, for entrapping crabs, lobsters, and like species, a bait is used, the bait being secured within the trap generally to its bottom such that when the trap is placed o the bottom of a body of water, the bait cannot be reached by aquatic creatures without entering the trap. Predominately, fish, frozen or salted or chicken parts are used in traps to trap crabs, lobsters, and like species. For example, fish heads, fish skeletons, fish entrails and other waste portions of the fish comprise the by-products resulting from the preparation of fish prepared as food products for humans. These by-products are used as the bait in such traps.

Crabs, lobsters, and the like are attracted to the bait essentially by the sense of smell from the odor emanating from oils, fluids, and minute particles of the bait materials which are carried in suspension by the water currents passing through the traps. Aquatic life species which are essentially attracted to their respective foodstuffs by a sense of smell, i.e., olfactory stimulation, tend to have very sensitive and highly developed olfactory senses. Predominantly, these forms of aquatic life tend to be bottom feeders with relatively poor visual capabilities. The odors produced by the suspended materials emanating from the bait provide an olfactory stimulant to various species of aquatic life. Pains are taken by the fishermen to use bait specimens to which the aquatic life species, which are the intended prey, are most attracted. These, in most cases, tend to be those fish species which provide the natural foodstuffs for the crabs, lobsters, and like species which are to be trapped.

Unfortunately, the fish by-products which tend to provide attractive olfactory stimulants to aquatic life, in many cases are often unattractive to humans, being most disagreeable and highly offensive to the human sense of smell. The fish by-products used as bait are irregular and inconsistent in shape, size and, composition and have a very slippery or "slimy" texture; thus, are relatively difficult to handle and to securely attach in the traps. In use, such fish by-product bait materials initially provide a high degree of attractiveness to the intended prey. However, this attractiveness rapidly dissipates as the currents wash away the olfactory stimulants from the surface of the bait material. Once the olfactory stimulants disperse through increasingly broader areas of water, the concentration of stimulants becomes dissipated and the path of travel of those olfactory stimulants from the bait material becomes obscured. Thus, the crabs, lobsters, and like species are less able to follow the path to the source of the bait, resulting in a lessening of the probability of their entering the trap.

Recently, the fishing industry has learned to use an increasing amount of the fish by-products for commercial purposes other than bait. For example, fish meals and fish emulsion preparations are finding increasing commercial use as "organic" fertilizers. This, of course, has consequently decreased the ready supply and availability of such by-products for use as bait materials, and the cost has rapidly increased. In addition, such natural fish by-product baits are not always available as there is an increasing recognition in the fishing industry that there are preferred seasons for catching different varieties of aquatic life. There is also an increasing environmental awareness and concern for pollution that may be caused by the pieces and parts of fish by-product bait materials which tend to partially break off and float free from the traps, being left to fully decompose and thus provide sources of water pollution. Since the bodies in which aquatic creatures are trapped tend to be relatively shallow waters close to shore line and thus human habitation, there is a growing degree of environmental and health-related concern. In addition, it is traditionally believed the fully decomposed fish by-products tend to have the opposite effect from that of the bait by-product, that opposite effect being to repel the crabs, lobsters, and like species rather than to attract them.

Many alternative forms of bait have been proposed to the fishing industry. Artificial baits, in the form of lures have been widely used for many years. Examples of such lures are shown in U.S. Pat. Nos. 4,700,504 and 4,216,605. Fish traps using no bait have also been proposed; an example of such is shown in U.S. Pat. No. 4,251,943. Lures which use live bait have likewise been proposed as shown, for example, in U.S. Pat. No. 4,020,580. The foregoing published references can all be classified as lures or "bait" having as their object the provision of visual stimulus to the fish which are the intended prey.

However, crabs, lobsters, and like species, which are bottom feeders, inhabit those areas of the water which see the least amount of light. Thus lures and bait which provide a visual stimulus are relatively ineffective in these areas. In addition, crabs, lobsters and like species do not naturally find their foods by way of visual stimulation. As mentioned above, they are attracted by smell or odor from their foodstuff which provide olfactory stimulation.

Consequently, a wide variety of types of artificial baits in the form of olfactory stimulants have been proposed. U.S. Pat. No. 2,555,088 shows a bag containing bait materials including slaughterhouse meat scrap tankage, dried slaughterhouse blood and animal entrails. The cloth bag of this reference is filled with bait material and placed onto a fish hook. U.S. Pat. No. 2,780,021 shows a variant of such a bait bag. U.S. Pat. No. 4,362,748 shows a method of producing pelletized bait which can be made to resemble, for example, maggots. These references are focused on providing olfactory stimulus to aquatic life with the object being to attract that aquatic life to a fish hook or to a trap.

Dried blood packaged in a plastic casing has also been proposed. Slits are formed in the sidewall of the plastic casing, enabling both infiltration of water and gradual seepage of the reconstituted blood from the package. Such a device is shown in U.S. Pat. No. 3,047,975. An artificial fish food specifically focused on attracting lobster as well as other aquatic life has been formed by converting natural muscle tissue of various animals, including fish, into acylated myofibrillar protein. Such a bait material, also proposed as a food, for various aquatic creatures is described in U.S. Pat. No. 3,903,304. The packaging of artificial "dough bait," in a "foraminous" material which is encased around the dough bait, is proposed by U.S. Pat. No. 3,958,357. Ground up, freeze-dried raw fish is packaged in a water permeable paper or cloth as described by U.S. Pat. No. 4,053,640.

A rather unique form of artificial bait is proposed by U.S. Pat. No. 4,731,247. In this reference, olfactory stimulants such as liquefied fish or other marine attractants, i.e., fish oils, anise, amino acids or synthetic attractants, as well as fish by-products, in a liquefied form, are proposed to be mixed with a water soluble cellulose ether composition in a plasticizing solvent to be formed into a solid material composite which may be used, as formed, or encased in a fiber such as fiberglass, cloth, plastic, or cellulose pulp to resemble a sausage in form.

PCT Patent Application Publication No. WO 86/06251 describes and illustrates a fish bait generally in the form of a sausage. The casing material is a tightly woven cotton or polyester fabric, which is porous and is said to permit some quantity of the oil from the ground fish, which is encased in the package, to leach out into the surrounding water. Conventional meat grinding and sausage stuffing equipment is sued to produce the product and the product is frozen for use as a fish hook bait principally for deepwater fishing.

It is not known from actual testing how effective any of the foregoing baits are in actual application. However, it is readily discernible from a reading of the foregoing published references that several tend to negatively criticize the effectiveness of their respective predecessors.

SUMMARY OF THE INVENTION

For many years, poultry products, principally chickens, have been packaged as boneless products in a rolled and encased form. Such packaging is performed by methods which initially involve deboning of all of the flesh and natural muscle tissue from the poultry, leaving as by-products skeletal remains comprising predominately bone with cartilage, tendons, etc., attached thereto. The marrow is left in the bone as well. The principal use of such skeletal remains is to produce dried pulverized bonemeal as is commonly used for, e.g., animal fodder. Fodder bonemeal composites, in dry powdered form, have even been used as bait material for snails as is described in Swiss Patent No. 510,399. Another use of such bonemeal in dry, powder form, is for fertilizers.

More recently, rapidly increasing amounts of turkey products are likewise produced in a boneless rolled and encased form, and they are packaged by the same methods used for packaging boneless rolled chicken. Very similar uses are made of the skeletal remains. In addition, boneless turkey flesh and natural muscle tissue is increasingly being used as an alternate ingredient for frankfurters.

It has recently been discovered by the inventor of the present invention that poultry skeletal remains, the by-products of producing boneless poultry products in the food packaging industry, are most attractive as a foodstuff for crabs, lobsters, and the like. It has also been recently discovered by the inventors of the present invention that poultry skeletal remains, unrendered and undried, as a direct by-product of a poultry mechanical deboning process, can be processed into a hamburger-like or sausage-like consistency by processing them through conventional equipment and systems which are presently widely used to produce ground beef and sausage products.

The present invention comprises a bait for crabs, lobsters, and other similar aquatic creatures which are predominately attracted to their food by olfactory stimulation. The bait of the present invention comprises mechanically deboned poultry skeletal remains which have not been rendered or dried and which are further processed to the consistency of hamburger (ground beef) and stuffed into food emulsion casings, for example, sausage casings or frankfurter casings, then preferably separated and sealed into lengths in a manner similar to that used to produce sausage or frankfurter links.

The casing material used may be any conventional casing material used for such products. If a water permeable casing material is used, no additional processing to the casing of the packaged product is needed. If a casing which is not water permeable is used, the casing material is preferably perforated before use as a bait.

It is believed that non-porous casings may be less susceptible to decomposition, over an extended period of time from ambient conditions present when the bait product of the present invention is contained within traps. The non-porous casing materials, in several cases, tend to be stronger and less susceptible to being torn by crabs, lobsters, and like species. However, these features are not deemed as significant advantages in comparison to the use of porous casing materials, as the porous casing materials are quite adequate in regard to decomposition resistance and strength over the period of use of the bait product of the present invention. The packaged product is preferably frozen and sold as such to the fishing industry. Alternately, the packaged product may be freeze-dried and further packaged in water tight containers to avoid hydroscopic water pick up by the encased product. The freeze-dried product can then be shipped and stored without freezing. In addition to freezing and freeze-drying, other methods of preserving the bait product may be utilized such as, for example, heating, chemical additives (preservatives), or irradiation, all of which are well known to those well skilled in the meat packing arts. The link form of the bait, being consistent and regular in shape, is readily attachable to the interior of traps used to trap crabs, lobsters, and the like. Further, the bait may readily be attached to fish hooks, either in a link form or divided by cutting into several pieces from each link. The texture of the surface of the bait product of the present invention is significantly less slippery or "slimy" in comparison to conventional fish by-product baits.

Due to the fibrous nature of the bone material, some degree of reinforcing is provided in the product by the intermingling of those fibrous materials; this tends to lock the discrete pieces, of the ground up skeletal remains, together. Thus, cut up lengths do not readily fall apart when placed on a fish hook and then lowered into the water and adjusted to the desired fishing depth. On the other hand, the casing surrounding the link product provides substantial coherence and structural integrity to the bait product. The combination of the fibrous interlocking of the bone material and the coherence and integrity provided by the casing tend to greatly inhibit disintegration of the physical structure of the bait product even when left in a trap such, as a lobster trap, for several days in vigorous currents. Thus when the trap is finally pulled up with its catch inside, the bait product is substantially structurally intact and may be disposed of in an environmentally safe manner or, if not substantially decomposed, may be reused. An important feature of this product, to the humans who must handle it, is that it does not exhibit the extremely offensive smell which predominates with fish by-products.

The bait product of the present invention can also readily be made from the skeletal remains of deboned beef and pork, although, with such skeletal remains, the component parts must be separated to a greater degree to permit further processing through the equipment used to produce the hamburger-like and sausage-like products. It has been found that bait products prepared from such deboned, unrendered beef and pork skeletal remains likewise provides olfactory stimulation to crabs, lobsters and like species, although to a somewhat lesser degree than that provided by deboned, unrendered poultry skeletal remains.

The casing materials which are used for stuffing the ground carcasses are preferably those used for sausages, i.e., collagen, regenerated cellulose either non-reinforced or fibrous reinforced type, and natural casings all of which are well known to those with skill in the art of sausage making. The individual pieces or links of bait product can be made in various dimensions and can be sealed by any one of several different means such as twisting, tying, clamping, etc., all of which are likewise well known to those with skills in the meat packing arts. The casing materials used are preferably naturally porous or are rendered so by soaking in water. The porosity of the casing material provides gradual diffusion of the surrounding water into the casing which then releases the flavor and the olfactory stimulant which, in turn, gradually diffuses out of the casing on a continuous basis over an extended period of time to create a distinct path back to the source of that the olfactory stimulant, i.e., the bait product, regardless of the ambient water currents and the propensity to carry that olfactory stimulant for some distance.

Preliminary observations have indicated that the olfactory stimulation provided by the bait product of the present invention, to crabs, lobsters, and like species, is apparently substantially greater over a substantially longer period of time in comparison to, for example, a similar bait product made using flesh and natural muscle tissue ground into a hamburger-like or sausage-like consistency. It is not known whether this distinction is due to a lesser degree of olfactory stimulation provided by ground up flesh and muscle tissue or whether the olfactory stimulation dissipates much more quickly when such material is used. Whatever the case, the production of crabs, lobsters, and like species caught in the traps seems to be significantly increased when the deboned unrendered ground up skeletal remains of the present invention are used as the bait material.

These and other features of the present invention will be more fully disclosed and described in the following detailed description of the preferred embodiment.

DETAILED DESCRIPTION OF THE INVENTION

In manufacture of rolled poultry products, for example, flesh is removed from the bone before cooking, or more desirable cuts, such as breasts, legs and thighs are removed from the carcass and sold individually. The less desirable parts (backs, necks etc.) and defleshed bones from boneless cuts are run through mechanical deboning equipment without being cooked. It has been found that cooked product does not work well as a bait. After the carcasses have been completely deboned and all usable flesh and natural muscle tissue have been removed, the skeleton is left, or more accurately various pieces of the skeleton are left. There are, of course, residual small pieces of meat still left attached to the bone material, plus, connective tissue such as tendons and cartilage. Likewise, the bone material still contains its internal constituents, i.e., marrow, etc. These are the skeletal remains which are preferably utilized in the present invention.

In conventional operations, the skeletal remains, after the deboning process is completed, may be rendered, dried, and converted into bone meal. Bone meal is completely dried and ground up bone product consisting essentially of calcium compounds, with substantially all protein value removed. The conversion of the skeletal remains from the deboning process into bonemeal comprises rendering those skeletal remains. In the rendering process, chemicals and heat are variously applied to the skeletal remains to completely separate the bone material per se from everything else. What is separated from the bone is converted into by-products such as tallow. After rendering, the bone is dried completely and ground and/or pulverized to a more or less powder consistency for use as animal fodder and fertilizer. In the manufacture of bone meal it is important to remove substantially all of the protein value from the bone, as the protein is subject to natural decomposition, i.e., spoilage and rotting, which would detrimentally effect the storage capability of the bonemeal.

The deboned flesh and natural muscle tissue removed from the poultry carcass is next subjected to some form of comminution wherein spices, seasonings, preservatives, etc., are also added. Then the meat product is processed through conventional meat emulsion stuffing apparatus such as that used to produce a variety of different cold-cut products such as bologna, various ham products, salami, etc. Essentially the meat product is stuffed into the casing material and further processed (it may be smoked to add flavor).

In the preferred embodiment of the present invention, the skeletal remains of the poultry, which are left following the deboning operation, are not rendered. Rather they are processed through grinding equipment to produce a product with a consistency of hamburger or pork sausage. The ground up skeletal remains which result are then fed through conventional sausage stuffing equipment, i.e., the type of equipment that is conventionally and widely used to produce, for example, frankfurters, sausage link products, etc. Optionally, various artificial attractants, as are known to those with skill in the art of bait preparation, may be added to the ground skeletal remains; however, this is not necessary.

In the sausage stuffing equipment, the ground skeletal remains are typically extruded by a meat emulsion pump through a stuffing horn. Typically, a shirred casing stick is sheathed over the stuffing the horn. The shirred casing stick may be of any one of a variety of different conventional casing materials as are used, for example, in sausage or frankfurter stuffing operations. These casing materials may be edible or non-edible and they may be either synthetic or natural. In the preferred embodiment of the present invention, regenerated cellulose is used as it is quite porous when water saturated and has reasonably high tensile and yield strength for extended in a water soaked condition. In addition, regenerated cellulose, when soaked in water, is extremely pliable and flexible, having a notable degree of resiliency. Regenerated cellulose is specifically the material which is conventionally used to form frankfurters in conjunction with extremely high speed and highly automated stuffing equipment. Alternatively, various other kinds of sausage product casing materials may be used such as, for example, collagen and natural casings. It is preferred that the casing material be porous in water to permit the infiltration of water into the bait product and the gradual diffusion and release of the olfactory stimulant from that product without substantial physical deterioration of the product itself. If non-porous casings are used in the present invention, it is preferred that the casing material be multiply pierced, as for example, by a fish hook or an ice pick to accomplish the same objective. Many types of conventional casing materials, both those which are porous and those which are not porous, are contemplated for use in the present invention, and none have been observed to exhibit any substantial degree of diminishment of olfactory stimulation to crabs, lobsters, and like species.

In the sausage stuffing operation, the casing material is substantially continuous, the shirred casing stick extending to lengths of 100 feet or more. As is well known in the food processing industry, casing materials of 100 feet or more in length are axially compressed to form accordion-like folds resulting in a package which may be, for example, only 10 to 20 inches in length. The shirred casing stick is then sheathed or telescoped over the stuffing horn which, in its simplest form, is an elongated tube extending from the meat emulsion pump. An end closure is formed in the casing material, for example, by tying or clipping its end. In the manufacture of frankfurters, for example, the casing material is merely twisted to form an end closure.

Normally, fibrous reinforced shirred casing stick is soaked usually in water, to soften it prior to its being sheathed or telescoped onto the stuffing horn of the sausage stuffing equipment. This makes it quite pliable, flexible, and resilient, enhancing its ability for handling, manipulation and stuffing. Collagen and non-fibrous reinforced cellulose casing casing need not be soaked prior to stuffing. A continuous length of stuffed casing material is divided into uniform lengths, i.e., links with ends sealed by twisting, tying or clipping and severed from one another. After such processing, the separated links are now substantially in the form of the end bait product.

Subsequent to formation, the link bait product form may be subjected to any one or more of a variety of different processes. For example, preservation of the product in an undecomposed form is essential to salability of the product and ultimately the product's effectiveness. In the preferred embodiment of the present invention, the link bait product form is frozen to preserve it, and it is ultimately marketed to the fishing industry in that form.

Alternately, the bait product may be freeze-dried using conventional methods, as are well known to those with skill in the art, to remove essentially all moisture content. If such a preservation method is utilized, the individual lengths of bait product are preferably vacuum packed in sealed containers to ensure that no moisture will reach the freeze dried individual lengths of bait product until actually used by the fishing industry. If the bait product links are freeze-dried, it may be necessary to soak them just prior to use if, for example, such bait product is to be used threaded over a fishing hook. On the other hand, a freeze-dried bait product link may be, for example, readily attached to a crab or lobster trap in the freeze-dried state without pre-soaking.

Other methods of preservation of the bait product of the present invention are contemplated within the scope of the present invention. For example, heating, chemical additives and irradiation methods may be used as are well known to those skilled in the meat processing industry.

The bait product may be formed in a variety of different sizes. Individual linking of the bait product is preferred, although more or less continuous product might be utilized by cutting pieces therefrom by the fisherman at the time of use. On the other hand, the individual links are convenient and can be pre-sized for the most advantageous and economical use.

As mentioned above, the bait product is preferably fastened to the floor section of a crab, lobster, or other type of trap, or placed in the bait cup which may be used for gathering aquatic prey. For example, the bait product may be tied or clipped to the wire mesh floor of trap. Alternatively, the bait product may be threaded over a fish hook in a longitudinal direction to conceal that hook. Other methods of utilization of the bait product will be readily apparent to those with skill in the fishing arts.

It has been determined by observation that the bait product of the present invention, especially in its preferred embodiment, provides substantial olfactory stimulus to crabs, lobsters, and like species. In addition, the preferred embodiment of the bait product of the present invention appears to provide good olfactory stimulation to other types of bottom feeding fish which are normally attracted to food by olfactory stimulation, as well as to other varieties of fish life which to one degree or another may be attracted to their food by olfactory stimulation. In particular, it appears that the skeletal remains of boned turkey, when formed into the bait product of the present invention, provide especially substantial olfactory stimulation to crabs, although the skeletal remains of deboned chicken, formed into the bait product of the present invention, also appeared to provide very good olfactory stimulation to crabs; lobsters and other like species seemed to be fairly equally attracted by olfactory stimulation to both products.

Preliminary observation indicates that crabs, lobsters, and like species are attracted by olfactory stimulation to the bait product of the present invention to a substantially greater degree for a substantially longer period of time in comparison to the attraction level provided, for example, by sausage, or like products, formed from the deboned flesh and natural muscle tissue of poultry. The reason for this selective attractiveness has not been specifically determined. Nevertheless, it is believed cooked products detract crabs. It has likewise been determined that crabs, lobsters, and like species are attracted by olfactory stimulation to bait products formed in the manner of the present invention from the skeletal remains of deboned beef and pork carcasses, but to a modest lesser degree than those bait products which utilize the deboned skeletal remains of poultry. However, within the contemplation of the present invention, the scope thereof encompasses the use of deboned but unrendered skeletal remains from poultry, beef, pork, and other non-aquatic vertebrate animal carcasses as are conventionally produced as by-products of deboning operations of the meat packing industry. It has been determined by preliminary observations that the unrendered skeletal remains of deboned beef and pork do appear to provide some degree of enhanced olfactory stimulation to crabs, lobsters, and the like in comparison to the deboned flesh and natural muscle tissue of poultry, pork, or beef.

A feature of the present invention is that the bait product thereof has substantial structural integrity. Because of the natural fibrous character of the bone of the deboned skeletal remains used to form the bait product of the present invention, a significant degree of natural fibrous reinforcement is notably inherent in the product. For example, the casing material may be stripped from the final form of the bait product, as delivered to the fishing industry, without substantial structural deterioration or break-up of the stripped meat product. This provides a particular advantage for use in traps which are to remain for long, i.e., several days, on the bottom of the fishing waters. For example, when a lobster enters a trap, it attacks the bait with sharp claws; ordinarily the casing material will be torn apart at discrete points. Because of the inherent structural integrity of the bait product, discrete particles of the bait will not readily separate themselves from the balance of the bait product to be carried away by currents flowing through the trap. Thus, the bait product continues to be effective to attract additional lobsters to the trap.

Observation indicates that crabs, lobsters, and like species continue to be attracted to the bait product of the present invention by olfactory stimulation for extended, for instance, periods ranging up to five days and longer. Thus, if the traps are pulled up at intermittent shorter intervals, the trapped prey can be removed and the traps dropped back into the water without change of the bait product.

Although the preferred and some alternate embodiments of the present invention have been described in considerable detail in the foregoing detailed description, it will be apparent to those skilled in the art that the present invention is capable of numerous modifications and variations without departing from the concepts, spirit and scope of the present invention as defined by the appended claims which are hereby specifically included, by this reference, into the foregoing specification.

What is claimed is:

1. A bait product for crabs or lobsters, which provides olfactory stimulation to the crabs or lobster comprising:
    a sealed sausage casing stuffed with a bait material consisting essentially of a quantity of unrendered skeletal remains, resulting from the deboning of uncooked non-aquatic vertebrate carcasses, ground into hamburger-like consistency.

2. The invention of claim 1 wherein said skeletal remains result as a by-product of the deboning of uncooked poultry carcasses or portions thereof.

3. The invention of claim 2 wherein said skeletal remains result as a by-product of the deboning of uncooked turkey carcasses or portions thereof.

4. The invention of claim 2 wherein said skeletal remains result as a by-product of the deboning of uncooked chicken carcasses or portions thereof.

5. The invention of claim 2 wherein said bait product is formed into at least one sausage link of conventional shape and size.

6. The invention of claim 1 wherein said skeletal remains result as a by-product of the deboning of uncooked beef carcasses or portions thereof.

7. The invention of claim 1 wherein said skeletal remains result as a by-product of the deboning of uncooked pork carcasses or portions thereof.

8. The invention of claim 1 wherein said skeletal remains are ground into hamburger-like consistency by conventional hamburger grinding methods.

9. The invention of claim 1 wherein said skeletal remains, ground into hamburger-like consistency, are stuffed into said sausage casing to the consistency, density, and uniformity obtained by conventional sausage stuffing methods.

10. The invention of claim 1 wherein said sausage casing is sealed by clipping the ends thereof.

11. The invention of claim 1 wherein said sausage casing is sealed by twisting the ends thereof.

12. The invention of claim 1 wherein said sausage casing is sealed by tying the ends thereof.

13. The invention of claim 1 wherein said bait product is formed into at least one sausage link of conventional shape and size.

14. The invention of claim 1 wherein the material of said sausage casing is regenerated cellulose.

15. The invention of claim 1 wherein the material of sausage casing is collagen.

16. The invention of claim 1 wherein the material of said sausage casing is a conventional natural casing material.

17. The invention of claim 1 wherein the material of said sausage casing is water permeable.

18. A method of producing a bait product for crabs or lobsters, said bait product providing olfactory stimulation to the crabs or lobsters comprising:
   a) retrieving the unrendered skeletal remains which result as by-products from deboning of uncooked, non-aquatic vertebrate carcasses;
   b) grinding said unrendered skeletal remains into hamburger-like consistency;
   c) stuffing a sausage casing with a bait material consisting essentially of said unrendered skeletal remains; and then
   d) sealing said sausage casing.

19. A bait product for crabs or lobsters which provides olfactory stimulation to the crabs or lobsters produced by a method comprising:
   a) retrieving the unrendered skeletal remains which result as by-products from deboning of uncooked, non-aquatic vertebrate carcasses;
   b) grinding said unrendered skeletal remains into hamburger-like consistency;
   c) stuffing a sausage casing with a bait material consisting essentially of said unrendered skeletal remains; and then
   d) sealing said sausage casing.

* * * * *